Patented June 5, 1934

1,961,890

UNITED STATES PATENT OFFICE 1,961,890

REFRIGERATION PROCESS

Ernest B. Miller and Gerald C. Connolly, Baltimore, Md., assignors, by mesne assignments, to Chester F. Hockley, receiver for The Silica Gel Corporation, Baltimore, Md., a corporation of Maryland No Drawing. Application August 14, 1931, Serial No. 557,196

16 Claims. (Cl. 62—179)

The present invention relates to refrigeration and more particularly to the type wherein the cooling effect is obtained by the evaporation of a liquid, and the vapor is taken up in a solid porous adsorbent.

Refrigerating systems of this type may comprise an evaporator or cooling chamber, containing the liquid to be evaporated or fluid evaporated by expansion through an orifice, an adsorber containing the adsorbing material, and a condenser for condensing the vapor driven off from the adsorbing material and returning it to said evaporator or cooling chamber. Where solid adsorbent material is employed for taking up the vapor from the cooling chamber, the adsorption must be effected in the substantially total absence of permanent gases, or the rate of adsorption will be so reduced that an effective cooling will not be secured. One form of apparatus suitable for the present invention is shown in Fig. 2 of Patent 1,729,081, granted September 24, 1929.

Various liquids may be employed in systems of this type, for instance, sulphur dioxide, water, ammonia, butane, methyl chloride, and amines such as methylamine, ethylamine, dimethylamine, tri-methylamine, etc. Likewise, various adsorbents may be used, for example, hard, porous gels such as the gels of silica, tungsten oxide, aluminum oxide, etc., and gels consisting of two or more of these oxides, activated charcoal, etc. However, not all of the adsorbents can be employed with any one liquid, and, vice versa, not all of the liquids can be employed with any one adsorbent. Many of the combinations of adsorbent and liquid will operate at first, but after repeated cycles either there is a breaking down of the vapor, gradually forming permanent gases, or else there is a reaction between the vapor and adsorbent that reduces the adsorptive power of the adsorbing material.

In an adsorption refrigeration system employing ammonia or an amine as the refrigerant, the present invention contemplates the use of an adsorbent consisting of a solid microporous material impregnated with or having associated therewith, a plurality of substances capable of forming with ammonia or an amine an ammino or amino compound, one of said substances yielding an ammino or amino compound which is solid, and another of said substances yielding an ammino or amino compound which is liquid. This adsorbent adsorbs the gaseous ammonia or amine without any substantial deterioration of the adsorbent and without the formation of permanent gases.

The solid, microporous material may be a dried gel containing at least one hydrous oxide, such as the oxide of silicon, tungsten, tin, aluminum, or titanium, or a dried gel containing two or more of said oxides like alumina-silica gel or a material having a pore structure similar to that of a dried gel, for example, base exchange compounds, or activated carbon. If desired, a dried gel containing one or more hydrous oxides admixed with activated carbon, a gel having a filler of the adsorbent type, such as Bentonite associated therewith, or non-homogeneous gels containing one or more hydrous oxides, may also be used. The base exchange compounds may be the natural occurring compounds, such as glauconite, suitable natural zeolites, and the like, or the artificially prepared compounds, for instance, sodium-chromium silicate, potassium-boron silicate, sodium-vanadium silicate, and the like, or the pore structure remaining after leaching the base exchange compound with either acid or water. It is to be understood that any natural or artificial base exchange compound may be employed which has a fine pore structure.

As previously stated, the adsorbent material is impregnated with a plurality of substances and these substances are those salts of metals capable of readily combining with ammonia or amine to form a metal ammino or amino compound respectively, under pressures such as occur in refrigerating systems of the type described herein, and, when heated to drive off or liberate the adsorbed ammonia or amine, will revert to the metal salt and ammonia or amine respectively. In other words, the salts of the metals with which the adsorbent material is impregnated are those which form simple or primary ammines or amines of the reversible type.

Some of the salts of the metals capable of yielding a metal ammino or amino compound in solid form which may be used are lithium chloride; silver nitrate or chloride; copper sulphate; magnesium chloride or sulphate; barium chloride; calcium chloride, zinc iodide, bromide, chloride, thiosulphate, perchlorate, chlorate, sulphate, nitrate, nitrite or oxalate; strontium chloride, cadmium chloride or sulphate; lead chloride; manganese sulphate; and ferrous chloride or sulphate. Of the salts mentioned, it is preferred to use those of the alkali forming metals such as lithium, calcium or strontium chloride. Although it is to be understood that any of the other metals salts may also be used.

The salts capable of yielding an ammino or amino compound in liquid form which may be used are, for example, lithium nitrate, chlorate or perchlorate; ammonium nitrate, and the like. While any of the aforementioned salts may be employed it is preferred to use lithium chlorate because it forms an ammino or amino compound which is more fluid than that obtained, for example, from lithium nitrate.

Where it is desired to use an amine as the refrigerant, methylamine is preferably employed.

The amount of metal salt capable of yielding a metal ammino or amino compound in solid form and also that salt capable of yielding an ammino or amino compound in liquid form with which the solid microporous material is impregnated is dependent upon the particular salts employed, and also the size of the pores of the adsorbent material. When gaseous ammonia reacts or combines with the anhydrous salt capable of forming an ammino compound in solid form, the salt swells in forming such ammino compound. The amount of swelling varies with the different salts and also the number of ammonia molecules with which the salt combines, for instance 2, 4, 6, or more molecules. Gaseous ammonia reacts or combines with some anhydrous salts to form an ammino compound in liquid phase which flows and moves in the pores of the gel particles. An amine acts similarly in that it reacts or combines with anhydrous salts to form an amino compound in the solid or liquid phase. By employing a mixture of salts, one forming a solid ammino or amino compound and the other forming a liquid ammino or amino compound, the liquid ammino or amino compound acts in some way to lessen or reduce the pressure caused by the swelling incident to the formation of the solid ammino or amino compound. Probably, the liquid ammino or amino compound floats or moves the solid ammino or amino compound and thereby distributes it within the available free space within the pores. The admixture of a salt yielding a liquid ammino or amino compound with the salt capable of forming a solid ammino or amino compound has the added advantage in that it enables the adsorbent material to be impregnated with a larger amount of the salt yielding a solid ammino or amino compound than otherwise possible.

The use of an adsorbent material impregnated with these two kind of salts reduces the breaking down or powdering of the gel particles to such an extent that the adsorbent so impregnated will operate at a high efficiency for an indefinite number of adsorption cycles.

Upon revivifying the adsorbent material as by heating, the ammino or amino compounds are decomposed into the salts and ammonia or amine respectively, the ammonia or amine being volatilized or driven off and the salts remaining with the adsorbent material.

The pores of the adsorbent material should be only partially filled with the mixture of salts, for if completely filled, the swelling that results from the combination of the salts, and ammonia or amine will rupture the walls of the pores and thus injure or destroy the materials' adsorption capacity. It is a prerequisite that the pores of the adsorbent material contain only such an amount of the salts as will permit the expansion of the ammino or amino compound without rupturing the pore walls. Samples of gel impregnated with 10% to 40% have given good results. The exact amount is dependent upon the salt and method of impregnation or the type of material impregnated.

As a specific example of the adsorbent which may be used in this invention, reference may be had to silica gel impregnated with lithium chloride and ammonium nitrate. This impregnated gel adsorbs ammonia or amine both chemically and physically, particularly when under pressures which occur in the refrigerating cycle described herein. One method of preparing such impregnated gel comprises immersing or soaking the silica gel in an aqueous solution containing both lithium chloride and ammonium nitrate. Preferably, the solution should contain about 24 parts of lithium chloride and about 8 parts of ammonium nitrate in 1000 cc. of water. The gel is allowed to remain in such solution for about 5 hours, and is then drained and dried. Before immersion in the salt solution, the gel may be treated to prevent decrepitation, if desired. The time of soaking should be such that the pores are only partially filled with the salts after the drying step.

Although the usual adsorbent materials, such as gels, base exchange compounds, or activated carbons, may be employed, it is preferred to use adsorbents having larger pores than usually employed for gas adsorption, which may be termed "wide pore" adsorbents. As previously explained, the pores should be only partially filled with the salt. If the adsorbent employed has wide pores, then it can be charged or impregnated with a larger percent by weight of the salts. Of course, the pores must not be enlarged to such an extent as to destroy or greatly reduce their action as capillaries. An illustration is found in a gel like silica gel having wide pores impregnated with calcium chloride, and lithium nitrate. The apparent density of the material is an indication as to whether or not it has large or small pores. Apparent density is the weight in grams of a cubic centimeter of the material composed of particles having a definite size, i. e., particles that will pass through an 8 mesh screen but remain on a 20 mesh screen. Silica gel having an apparent density of 0.65 or 0.7 after activation at 600° F. has smaller pores than silica gel of a less apparent density, say 0.6, after activation at 600° F. There are various methods of preparing low density gels. According to one method, a suitable washed hydrogel is impregnated with a substance soluble in a leaching medium chemically inert with respect to the gel, such as copper sulphate, aluminum chloride, sodium sulphate, calcium chloride, and the like, drying the impregnated hydrogel, and leaching out the substance with either water or acid, depending upon the particular substance used.

In this method a hydrogel is prepared in any suitable manner, for instance, in accordance with the instructions given in the Patrick Patent 1,297,724, as by adding, with agitation, a solution of sodium silicate to an equal volume of an acid solution, such as a 10% solution by weight of hydrochloric acid, the specific gravity of the silicate solution being about 1.185. The ratio of $SiO_2$ to $Na_2O$ in the silicate solution may be as in any commercial solution, about 3.25 to 1. After a time the reaction mixture of sol, as it is called, sets to a homogeneous jelly-like mass. This is broken into pieces and washed with water, preferably at 105° to 175° F., to remove salt and acid, and then soaked in a 10% to 15% solution of the salt, say calcium chloride, for about 4 hours, although solutions of other strengths may be employed. The solution is drained from the hydrogel, and then the hydrogel is dried in a current of air at about 125° C., which after a time may be increased to 400° C.

The salt impregnated gel is leached with water, preferably hot water at about 180° F., and the leaching continued until substantially all of the calcium chloride has been removed or until the leaching water shows only a trace when tested with a solution of silver nitrate. Most of the calcium chloride leaches out rather readily, and the resulting solution can be used again for impregnating more hydrogel.

If the gel is of a type that decrepitates, before the leaching, it may be caused to adsorb 20% or 30% of water vapor to prevent decrepitation or shattering of the gel granules. This may be done by introducing a small amount of water vapor in the form of steam into a stream of air and then passing the air mixture over the gel. If desired, the gel particles may be arranged in a thin layer and then exposed to the atmosphere of the room in which steam may or may not be introduced.

The strength of the calcium chloride or other impregnating solution may be varied according to convenience, and the temperature at which the soluble material is leached out likewise may be varied according to convenience or necessity.

Here it is preferable, but not essential, to reactivate the leached gel at a relatively high temperature, say 1000° F.

The method just described for making a low density gel is claimed in application, Serial No. 444,880, filed April 16, 1930.

This low density gel or gel having enlarged or wide pores is next charged with a mixture of calcium chloride and lithium nitrate. This is done by immersing the gel in a solution containing about 18 parts of calcium chloride and 9 parts of lithium nitrate in 1000 cc. of water for a time sufficient to only partially fill the pores. If the gel is of a type that decrepitates it may be partly charged with water vapor as previously described before immersing in the solution. As the size of the pores in the different adsorbents varies, no rule applicable to all adsorbents can be given as to the length of time for this treatment. For a gel made by the foregoing process the immersion in the solution containing the two salts should last for about 2 hours or more, or the solution may be sprayed on the gel.

Then the solution is drained from the gel, and it is dried or activated as by passing a current of air at 600° F. over the same for about 3 hours.

According to another method of accomplishing the desired impregnation, the low density dried gel is impregnated with, say, 30% or 40% of the dry weight of the gel with the mixture of salts, and this is immersed in water for a short time to reduce the salt content to the desired amount, say 25%.

It is to be understood that the process just described gives a very satisfactory product, but the invention is not limited to a product made in this way, as any other satisfactory process might be employed.

As an example of a method of making an alumina-silica gel impregnated with a salt capable of yielding a liquid ammino or amino compound and a salt yielding a solid ammino or amino compound, the following may be given. An alumina jelly is prepared by mixing equal volumes of a solution of aluminum sulphate of about 5% to 10% strength and a normal alkali solution such as sodium hydroxide or ammonium hydroxide at zero degrees C. or lower. Care should be taken that the reaction mass is alkaline. The jelly or gelatinous precipitate that forms is washed by decantation to free it of excess alkali and ammonium or sodium sulphate, depending upon the particular alkali employed in the formation of the precipitate.

The alumina jelly is then thoroughly mixed with washed silica hydrogel, prepared as described in the previous example, in the proportion of not more than one part of alumina jelly to ten parts of silica hydrogel by weight.

The intermixed mass of alumina-silica jelly and hydrogel is soaked in a solution containing both strontium chloride and lithium chlorate for about 4 hours. Preferably, the solution should contain about 12 parts of strontium chloride and 6 parts of lithium chlorate in 1000 cc. of water. Thereafter the solution is drained from the jelly, and the jelly is dried in a current of air at 125° C., which after some time may be increased to 400° C.

Before charging the refrigerating apparatus with any of the salt impregnated adsorbents described herein, and particularly salt impregnated gels, the product preferably should be activated at 375° to 450° C. to reduce the moisture content to a low point, say not more than about 3% or 4% of the dry product by weight. With this low moisture content there is no, or insufficient, reaction between the ammonia or amine and water, to form a compound that may injure the adsorbent.

The term "evaporating" as used herein is intended to apply to any means for causing vapor to form from a liquid, whether by heat, or expansion through an orifice, or otherwise.

In the claims, the term "amo" is used to designate both ammonia and an amine; the term "amo compound" to cover the compounds obtained when a substance capable of combining with ammonia or an amine is contacted with ammonia or an amine to form an ammino or amino compound; and the term "metal amo compound" to cover both the metal ammino and amino compounds formed when a metal salt combines with ammonia or an amine respectively.

Having thus described the invention, what is claimed as new and desired to be secured by Letters Patent is:—

1. A method of refrigeration consisting in evaporating liquid amo and adsorbing the gaseous amo, in the substantial absence of permanent gases, in an adsorbent consisting of a solid porous material impregnated with substances capable of combining with said amo to form amo compounds, one of said substances yielding a solid amo compound and another of said substances a liquid amo compound.

2. The method according to claim 1 wherein the porous material is a material of a gel structure.

3. A method of refrigeration consisting in evaporating liquid amo and adsorbing the gaseous amo, in the substantial absence of permanent gases, in an adsorbent consisting of a gel impregnated with salts capable of combining with said amo to form amo compounds, one of said salts yielding a solid amo compound and another of said salts a liquid amo compound.

4. The method according to claim 3 wherein the gel is silica gel.

5. The method according to claim 3 wherein the gel is silica-alumina gel.

6. A method of refrigeration consisting in evaporating liquid amo and adsorbing the gaseous amo, in the substantial absence of permanent gases, in an adsorbent consisting of a gel impregnated with a metal salt capable of combining with said amo to form a metal amo compound in solid form and a salt capable of combining with said amo to form an amo compound in liquid form.

7. The method according to claim 6 wherein the gel is silica gel.

8. The method according to claim 6 wherein the gel is silica-alumina gel.

9. The method of refrigeration consisting in evaporating liquid ammonia and adsorbing the ammonia gas, in the substantial absence of permanent gases, in an adsorbent consisting of a gel impregnated with a salt of an alkali forming metal capable of combining with said ammonia to form a metal ammino compound in solid form and a salt capable of combining with said ammonia to form an ammino compound in liquid form.

10. The method according to claim 9 wherein the salt of an alkali forming metal is lithium chloride, and the salt is ammonium nitrate.

11. The method according to claim 9 wherein the salt of an alkali forming metal is calcium chloride, and the salt is lithium nitrate.

12. The method according to claim 9 wherein the salt of an alkali forming metal is strontium chloride, and the salt is lithium chlorate.

13. The method of refrigeration consisting in evaporating liquid ammonia and adsorbing the ammonia gas, in the substantial absence of permanent gases, in an adsorbent consisting of a gel including the oxide of silicon impregnated with a salt of an alkali forming metal capable of combining with said ammonia to form a metal ammino compound in solid form and a salt capable of combining with said ammonia to form an ammino compound in liquid form.

14. The method according to claim 13 wherein the salt of an alkali forming metal is lithium chloride, and the salt is ammonium nitrate.

15. The method according to claim 13 wherein the salt of an alkali forming metal is calcium chloride, and the salt is lithium nitrate.

16. The method according to claim 13 wherein the salt of an alkali forming metal is strontium chloride, and the salt is lithium chlorate.

ERNEST B. MILLER.
GERALD C. CONNOLLY.